United States Patent [19]
Ueda

[11] Patent Number: 6,157,181
[45] Date of Patent: Dec. 5, 2000

[54] STEP-DOWN DC/DC CONVERTER FOR CONVERTING A HIGH DC INPUT VOLTAGE INTO A LOW DC OUTPUT VOLTAGE

[75] Inventor: Hidefumi Ueda, Fukuoka, Japan

[73] Assignee: Kabushiki Kaisha Yaskawa Denki, Japan

[21] Appl. No.: 09/355,191

[22] PCT Filed: Jan. 20, 1998

[86] PCT No.: PCT/JP98/00182

§ 371 Date: Jul. 21, 1999

§ 102(e) Date: Jul. 21, 1999

[87] PCT Pub. No.: WO98/33265

PCT Pub. Date: Jul. 30, 1998

[30] Foreign Application Priority Data

Jan. 22, 1997 [JP] Japan .................................. 9-009494

[51] Int. Cl.[7] ..................................................... G05F 1/44
[52] U.S. Cl. ........................... 323/282; 323/300; 323/290
[58] Field of Search ..................................... 323/282, 289, 323/290, 223, 299

[56] References Cited

U.S. PATENT DOCUMENTS 5,610,503   3/1997   Fogg et al. ............................... 323/283

FOREIGN PATENT DOCUMENTS

3-63079    6/1991   Japan .
5-304768   11/1993  Japan .
7-241071   9/1995   Japan .

*Primary Examiner*—Shawn Riley
*Attorney, Agent, or Firm*—Knobbe, Martens, Olson & Bear, LLP

[57] ABSTRACT

It is an object of the present invention to provide a step-down DC/DC converter which is resistant to common-mode noise, there are no significant restrictions on a main transistor used, on its energizing circuit and the frequency of the on and off cycles of the main transistor, etc., and is capable of generating a low DC output voltage from a high DC input voltage. The step-down DC/DC converter has a DC power supply, a main switching element having a drain terminal connected to a positive terminal of the DC power supply, an inductive element having a terminal connected to a source terminal of the main switching element, a first capacitor connected between the inductive element and a negative terminal of the DC power supply, a first diode connected between the source terminal of the main switching element and the negative terminal of the DC power supply parallel to a series-connected circuit of the inductive element and the first capacitor, a resistive element having a terminal connected to the positive terminal of the DC power supply and the drain terminal of the main switching element, a second capacitor connected between the resistive element and the source terminal of the main switching element and the cathode terminal of the first diode, a control circuit for controlling the turning on and off of the main switching element, and a second diode having an anode terminal connected to the junction between the inductive element and the first capacitor and a cathode terminal connected to the junction between the resistive element and the second capacitor.

17 Claims, 11 Drawing Sheets

STEP-DOWN DC/DC CONVERTER FOR CONVERTING A HIGH DC INPUT VOLTAGE INTO A LOW DC OUTPUT VOLTAGE

TECHNICAL FIELD

The present invention relates to a step-down DC/DC converter, and more particularly to a step-down DC/DC converter for converting a high DC input voltage into a low DC output voltage.

BACKGROUND ART

Heretofore, there have been widely used step-down DC/DC converters in power supply circuits for electronic devices or the like, for turning on and off semiconductor switching elements to convert a DC input power supply voltage into a DC output voltage which is lower than the DC input power supply voltage.

Figure 1:
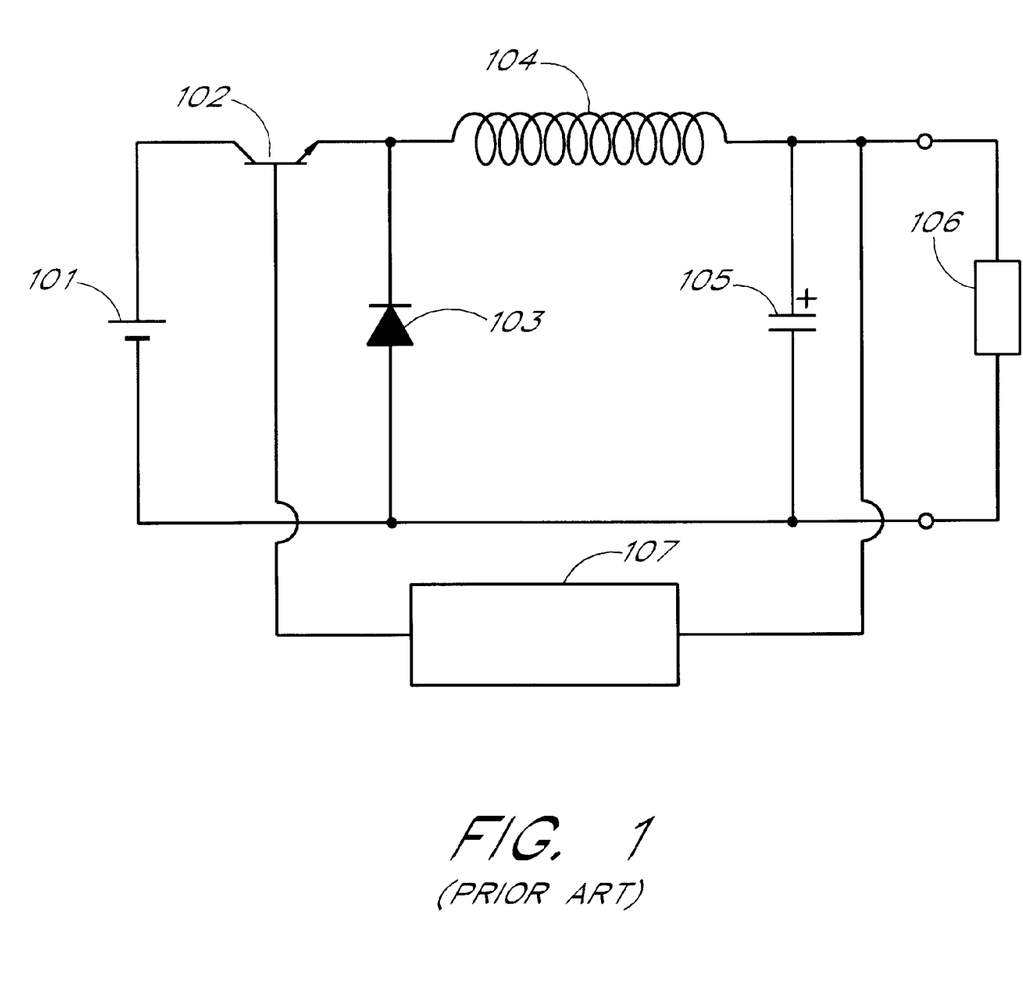
FIG. 1 is a circuit diagram of the arrangement of a conventional step-down DC/DC converter.

FIG. 1 is a circuit diagram of the arrangement of a conventional step-down DC/DC converter.

As shown in FIG. 1, the conventional step-down DC/DC converter comprises a DC power supply 101, a main transistor 102 as a main switching element having a collector terminal connected to the positive terminal of the DC power supply 101, a main recirculation diode 103 as a main recirculation rectifying element connected between the emitter terminal of the main transistor 102 and the negative terminal of the DC power supply 101, with the emitter terminal of the main transistor 102 being connected to the cathode of the main recirculation diode 103, a series-connected circuit comprising a smoothing reactor 104 and a smoothing capacitor 105 which are connected parallel to the main recirculation diode 103, a load 106 connected parallel to the smoothing capacitor 105, and a control circuit 107 for outputting an on and off control signal to the base terminal of the main transistor 102.

In the step-down DC/DC converter of the above arrangement, depending on a change in the voltage across the smoothing capacitor 105, which is a low DC output voltage, the duration of the on and off control signal applied to the base terminal of the main transistor 102 varies for thereby controlling the on period of the main transistor 102 to stabilize the voltage across the smoothing capacitor 105, i.e., the voltage supplied to the load 106.

Figure 2:
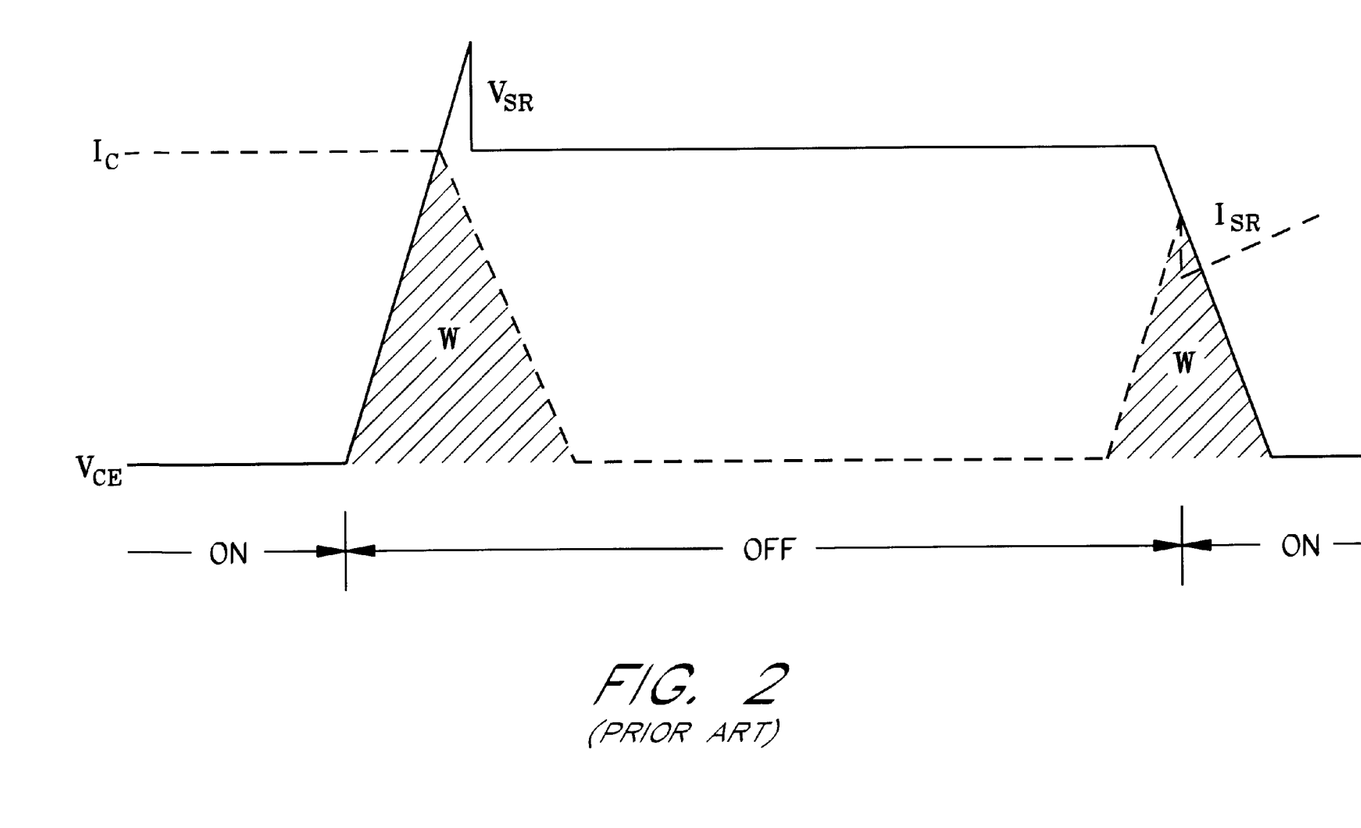
FIG. 2 is a diagram showing an overlap between a switching voltage waveform and a switching current waveform of the step-down DC/DC converter shown in FIG. 1.

FIG. 2 is a diagram showing an overlap between a switching voltage waveform and a switching current waveform of the step-down DC/DC converter shown in FIG. 1.

As shown in FIG. 2, the step-down DC/DC converter shown in FIG. 1 has a problem in that when the main transistor 102 is turned on or off, a collector-to-emitter voltage waveform $V_{CE}$ of the main transistor 102 and a collector current waveform Ic of the main transistor 102 overlap each other in areas W, and a large switching loss occurs in the overlapping areas W. Another problem is that spike surge voltage $V_{SR}$, surge current $I_{SR}$, and noise are produced at positive-going edges of the collector-to-emitter voltage waveform $V_{CE}$ and the collector current waveform $I_C$.

Japanese laid-open patent publication No. 7-241071 discloses a step-down DC/DC converter capable of reducing the switching loss, the surge voltage, the surge current, etc. as described above.

Figure 3:
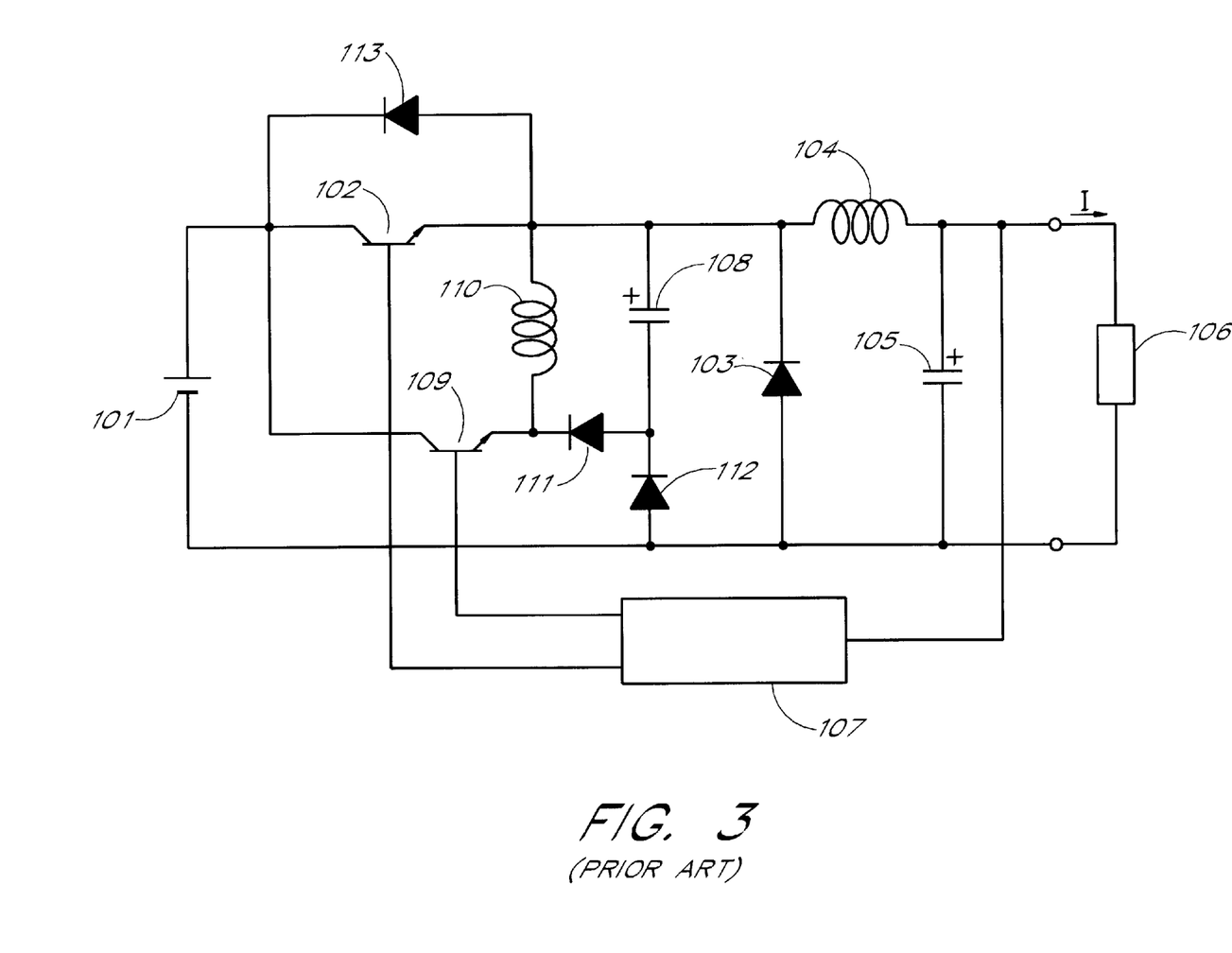
FIG. 3 is a circuit diagram showing the arrangement of a step-down DC/DC converter disclosed in Japanese laid-open patent publication No. 7-241071.

FIG. 3 is a circuit diagram showing the arrangement of the step-down DC/DC converter disclosed in Japanese laid-open patent publication No. 7-241071.

As shown in FIG. 3, the step-down DC/DC converter disclosed in Japanese laid-open patent publication No. 7-241071 includes, as parts added to the step-down DC/DC converter shown in FIG. 1, a series-connected circuit of an auxiliary transistor 109 as an auxiliary switching element and a resonant reactor 110 which are connected parallel to the main transistor 102, a series-connected circuit of auxiliary recirculation diodes 111, 112 connected between the junction between the auxiliary transistor 109 and the resonant reactor 110 and the negative terminal of the DC power supply 101, a resonant capacitor 108 connected between the junction between the auxiliary recirculation diodes 111, 112 and the emitter terminal of the main transistor 102, and a circulating current diode 113 connected parallel to the main transistor 102.

Operation of the step-down DC/DC converter of the above arrangement will be described below.

When the main transistor 102 is turned off while a current is flowing to the load 106 and the resonant capacitor 108 is being charged up to the power supply voltage in an on state of the main transistor 102, the current that has flowed through the main transistor 102 immediately switches to the current flowing through the resonant capacitor 108, which is then gradually discharged. At this time, the voltage across the main transistor 102 gradually rises from 0 V. Since zero-voltage switching is achieved when the main transistor 102 is turned off, a switching loss caused when the main transistor 102 is turned off can be reduced.

When the control circuit 107 applies an auxiliary control pulse to a control terminal of the auxiliary transistor 109 to turn on the auxiliary transistor 109 before applying a main control pulse to a control terminal of the main transistor 102 to turn on the main transistor 102, the power supply voltage is applied to the resonant reactor 110 and the current flowing through the resonant reactor 110 linearly increases during the period in which the main recirculation diode 103 is conducting. Because zero-voltage switching is achieved when the auxiliary transistor 109 is turned on, a switching loss caused when the auxiliary transistor 109 is turned on can be reduced.

As the current flowing through the resonant reactor 110 increases, the current flowing through the main recirculation diode 103 linearly decreases. When the current flowing through the resonant reactor 110 becomes equal to the load current, the main recirculation diode 103 is cut off. When the main transistor 102 is turned on at this time, the collector-to-emitter voltage of the main transistor 102 immediately drops to 0 V. Inasmuch zero-voltage switching is achieved when the main transistor 102 is turned on, a switching loss caused when the main transistor 102 is turned on can be reduced.

When the auxiliary transistor 109 is subsequently turned off with a slight delay, a resonant current flows through the resonant reactor 110 and the resonant capacitor 108, and the voltage across the resonant capacitor 108 rises from 0 V in a sinusoidal fashion. When the voltage across the resonant capacitor 108 reaches a maximum level, the resonant current becomes nil. When the auxiliary transistor 109 is turned off, a current flows to the smoothing reactor 104 via the main transistor 102. Since zero-voltage switching is achieved when the auxiliary transistor 109 is turned off, a switching loss caused when the auxiliary transistor 109 is turned off can be reduced.

In the manner described above, the switching loss when the main transistor 102 and the auxiliary transistor 109 are turned on and off can be reduced.

Spike surge voltage and surge current generated when the main transistor 102 and the auxiliary transistor 109 are turned on and off are absorbed by the resonant capacitor 108 and the resonant reactor 110. Therefore, a surge voltage, a surge current, and noise can be reduced when main transistor 102 is turned on and off.

Figure 4:
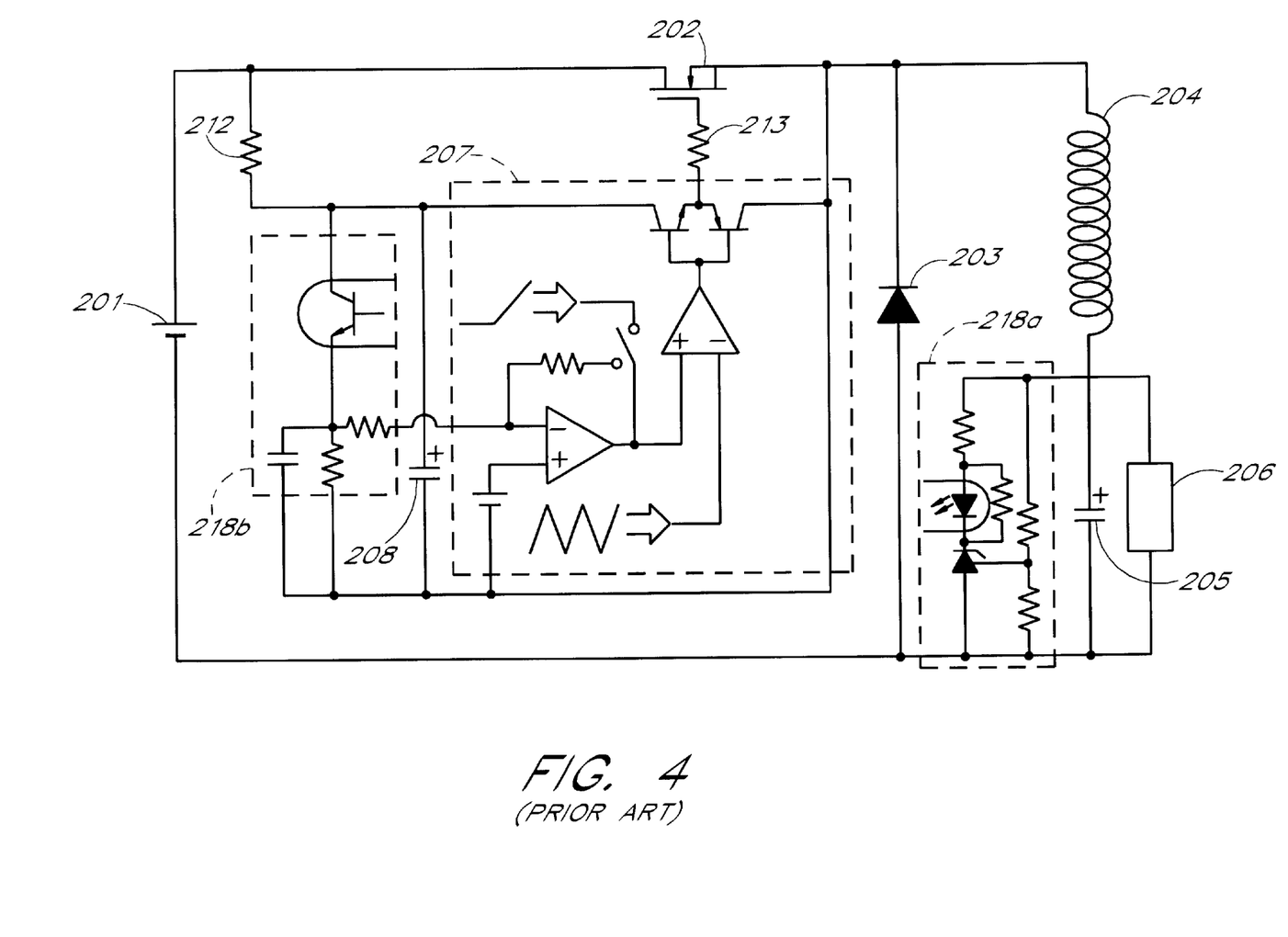
FIG. 4 is a circuit diagram showing the arrangement of another conventional step-down DC/DC converter.

FIG. 4 is a circuit diagram showing the arrangement of another conventional step-down DC/DC converter.

As shown in FIG. 4, the conventional step-down DC/DC converter comprises a DC power supply 201, a MOSFET 202 as a main switching element having a drain terminal connected to the positive terminal of the DC power supply 201, a main recirculation diode 203 as a main recirculation rectifying element connected between the source terminal of the MOSFET 202 and the negative terminal of the DC power supply 201, with the source terminal of the MOSFET 202 being connected to the cathode of the main recirculation diode 203, a series-connected circuit of an inductive element 204 and a capacitor 205 which are connected parallel to the main recirculation diode 203, a load 206 connected parallel to the capacitor 205, a resistor 212 having a terminal connected to the positive terminal of the DC power supply 201, a capacitor 208 having a terminal connected to the other terminal of the resistor 212 and another terminal connected to the source terminal of the MOSFET 202, a control circuit 207 energized by the voltage across the capacitor 208 for applying an on and off control signal to the gate terminal of the MOSFET 202, a resistor 213 connected between the gate terminal of the MOSFET 202 and the control circuit 207, and a voltage feedback transmission circuit 218a, 218b including a photocoupler for applying the voltage across the capacitor 205 to the control circuit 207.

In the step-down DC/DC converter of the above arrangement, depending on a change in the voltage across the capacitor 205, which is a low DC output voltage obtained through the voltage feedback transmission circuit 218a, 218b, the duration of the on and off control signal applied from the control circuit 207 to the gate terminal of the MOSFET 202 varies for thereby controlling the on period of the MOSFET 202 to stabilize the voltage across the capacitor 205, i.e., the voltage supplied to the load 206.

However, the conventional step-down DC/DC converters described above have the following problems:

(1) The conventional step-down DC/DC converters shown in FIGS. 1 and 3:

When the main transistor 102 is turned on, the emitter potential of the main transistor 102 is substantially equalized to the, potential of the positive terminal of the DC power supply 101. Therefore, in order to keep the main transistor 102 turned on, it is necessary to make the voltage of the on control signal applied from the control circuit 107 to the base terminal of the main transistor 102 substantially equal to the potential of the positive terminal of the DC power supply 101.

When the voltage of the DC power supply 101 is high, however, it is difficult to make the voltage of the on control signal applied from the control circuit 107 to the base terminal of the main transistor 102 substantially equal to the potential of the positive terminal of the DC power supply 101, resulting the possibility of in a failure to generate a low DC output voltage from the high DC input voltage.

(2) The conventional step-down DC/DC converter shown in FIG. 4:

Since the ground potential of the control circuit 207 which applies the on and off control signal to the gate terminal of the MOSFET 202 is equal to the source potential of the MOSFET 202, the on control signal applied from the control circuit 207 to the gate terminal of the MOSFET 202 in order to keep the MOSFET 202 turned on may be of a low voltage. Therefore, even when the voltage of the DC power supply 201 is high, it is possible to generate a low DC output voltage from the high DC input voltage.

However, because the power supply for energizing the control circuit 207 comprises an R•C (resistor and capacitor) charging circuit which comprises the resistor 212 having one terminal connected to the positive terminal and the capacitor 208 connected to the other terminal of the resistor 212, it is necessary to reduce the current consumed by the control circuit 207. Such a requirement places significant limitations on the main transistor used and its energizing circuit, the frequency of on and off cycles of the main transistor, etc.

Furthermore, common-mode noise tends to be introduced because the voltage feedback for controlling the output voltage is performed by the voltage feedback transmission circuit 218a, 218b including the photocoupler.

SUMMARY

The present invention has been made in view of the problems of the conventional step-down DC/DC converters described above. It is an object of the present invention to provide a step-down DC/DC converter which is resistant to common-mode noise, there are no significant restrictions on the main transistor used, on its energizing circuit and the there for cycles of the main transistor, etc., and is capable of generating a low DC output voltage from a high DC input voltage.

To achieve the above object, there is provided in accordance with the present invention a step-down DC/DC converter having a DC power supply, a main switching element having a drain terminal connected to a positive terminal of the DC power supply, an inductive element having a terminal connected to a source terminal of the main switching element, a first capacitor having a positive terminal connected to a terminal of the inductive element which is opposite to the terminal thereof to which the main switching element is connected, and a negative terminal connected to a negative terminal of the DC power supply, a first diode connected between the source terminal of said main switching element and the negative terminal of said DC power supply parallel to a series-connected circuit of said inductive element and said first capacitor, said first diode having a cathode terminal connected to the source terminal of said main switching element, a resistive element having a terminal connected to the positive terminal of said DC power supply and the drain terminal of said main switching element, a second capacitor having a positive terminal connected to a terminal of the resistive element which is opposite to the terminal connected to the positive terminal of said DC power supply and the drain terminal of said main switching element, and a negative terminal connected to the source terminal of said main switching element and the cathode terminal of said first diode, and a control circuit having a ground terminal connected to the source terminal of said main switching element, for outputting a control signal for controlling the turning on and off of said main switching element to a gate terminal of said main switching element, characterized in that a second diode having an anode terminal is connected to the junction between said inductive element and said first capacitor and a cathode terminal connected to the junction between said resistive element and said second capacitor.

The step-down DC/DC converter also includes a step-down circuit connected between said resistive element and said second diode and having an input terminal connected to the cathode terminal of said second diode and an output terminal connected to said resistive element and the positive terminal of said second capacitor, said step-down circuit having a preset voltage drop.

The step-down DC/DC converter also includes a step-down circuit connected between the junction between said inductive element and said first capacitor and the anode terminal of said second diode and has an input terminal connected to the junction between said inductive element and said first capacitor and an output terminal connected to the anode terminal of said second diode, said step-down circuit having a preset voltage drop.

The step-down DC/DC converter also includes a step-down circuit connected between the source terminal of said main switching element and said inductive element and the cathode terminal of said first diode and has an output terminal connected to the source terminal of said main switching element and said inductive element, said step-down circuit having a preset voltage drop.

The step-down DC/DC converter also includes a step-down circuit connected between the anode terminal of said first diode and said DC power supply and the negative terminal of said first capacitor and has an input terminal connected to said DC power supply and the negative terminal of said first capacitor, said step-down circuit having a preset voltage drop.

The control circuit compares a voltage across said second capacitor with a reference voltage generated therein, and outputs said control signal to the gate terminal of said main switching element based on the result of comparison.

The control circuit compares a potential difference between the source terminal of said main switching element with the cathode terminal of said second diode and a reference voltage generated therein, and outputs said control signal to the gate terminal of said main switching element based on the result of comparison.

The main switching element comprises a MOSFET.

The main switching element comprises an IGBT.

The main switching element comprises a bipolar transistor.

When the DC power supply starts to operate, a current flows from the positive terminal of the DC power supply successively to the resistive element connected to the DC power supply, the second capacitor connected to the other terminal of the resistive element, the inductive element connected to the other terminal of the second capacitor, the first capacitor connected to the other terminal of the inductive element, and the negative terminal of the DC power supply connected to the other terminal of the first capacitor, for thereby charging the second capacitor. The voltage across the charged second capacitor serves as a power supply to start energizing the control circuit which controls the turning on and off of the main switching element.

After the control circuit has started to be energized, the voltage across the second capacitor falls. Because of the turning on and off of the main switching element, the voltage across the first capacitor begins to increase. When the main switching element changes from an on state to an off state, the flow of the current from the positive terminal of the DC power supply successively to the main switching element, the inductive element, the first capacitor, and the negative terminal of the DC power supply changes to a mode in which the current flows to the inductive element, the first capacitor, the first diode, and back to the inductive element. At this time, the potential of the source terminal of the main switching element (or the potential of the negative terminal of the second capacitor or the ground potential of the control circuit) is lower than the potential of the negative terminal of the DC power supply (or the potential of the negative terminal of the first capacitor) by an amount of the forward voltage of the first diode. Therefore, when the voltage across the first capacitor becomes higher than the voltage across the second capacitor (when the control circuit starts to operate, the voltage across the second capacitor decreases, and the voltage across the first capacitor increases), the second diode whose anode terminal is connected to the positive terminal of the first capacitor and whose cathode terminal is connected to the positive terminal of the second capacitor supplies electric energy from the positive terminal of the first capacitor to the second capacitor. The control circuit thus maintains its energizing power supply to continuously control the operation of the main switching element.

At this time, the voltage across the second capacitor becomes equal to the voltage across the first capacitor. Therefore, when the control circuit directly controls the voltage across the second capacitor, the voltage across the first capacitor, which is the output voltage of the step-down DC/DC converter, is indirectly controlled.

Because the control circuit maintains its energizing power supply, it is not necessary to reduce its current consumption, and there are no significant restrictions on the main transistor used, on its energizing circuit and the frequency of the on and off cycles of the main transistor, etc. Furthermore, common-mode noise does not tend to be introduced because a photocoupler does not need to be used in a voltage feedback loop for controlling the output voltage.

If the voltage across the second capacitor is set to be lower than the voltage across the first capacitor, then the step-down circuit with a preset voltage drop is employed to lower the voltage across the first capacitor and thereafter supply electric energy to the second capacitor. Thus, the voltage across the second capacitor becomes lower than the voltage across the first capacitor by the amount of the voltage drop caused by the step-down circuit.

When the control circuit directly controls the voltage across the second capacitor, the voltage across the first capacitor, which is the output voltage of the step-down DC/DC converter, is indirectly controlled so as to be lower than the voltage across the second capacitor by the amount of the voltage drop caused by the step-down circuit.

If the voltage across the second capacitor is set to be higher than the voltage across the first capacitor, then the first diode and the step-down circuit which are connected in series with each other is connected parallel between the inductive element and the first capacitor which are connected in series with each other, so that the potential of the source terminal of the main switching element as it is turned off becomes lower than the potential of the negative terminal of the DC power supply by the amount of the forward voltage of the first diode and the voltage drop caused by the step-down circuit. Consequently, the voltage across the second capacitor is set to a value which is higher than the voltage across the first capacitor by the voltage drop caused by the step-down circuit.

When the control circuit directly controls the voltage across the second capacitor, the voltage across the first capacitor, which is the output voltage of the step-down DC/DC converter, is indirectly controlled so as to be lower than the voltage across the second capacitor by the amount of the voltage drop caused by the step-down circuit.

Even if the voltage controlled by the control circuit is not the voltage across the second capacitor, but the voltage between the cathode terminal of the second diode and the source terminal of the main switching element, the voltage across the first capacitor, which is the output voltage of the step-down DC/DC converter, is indirectly controlled.

BRIEF DESCRIPTION OF THE DRAWINGS

FIG. 6 is a circuit diagram showing a charging current route for a capacitor 8 at the time a commercial power supply of the step-down DC/DC converter shown in FIG. 5 is turned on;

BEST MODE FOR CARRYING OUT THE INVENTION (1st Embodiment)

Figure 5:
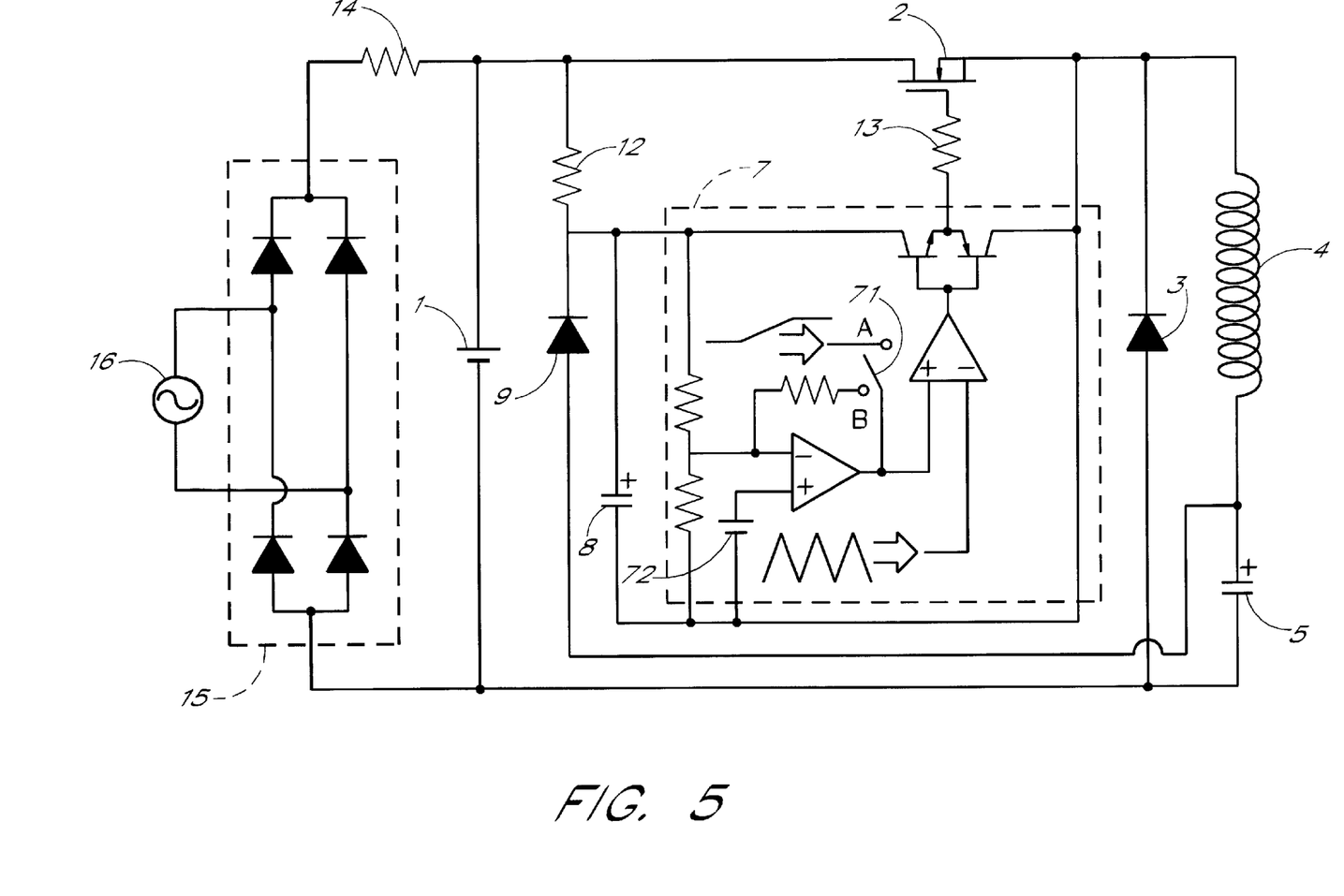
FIG. 5 is a circuit diagram of a step-down DC/DC converter according to a first embodiment of the present invention.

FIG. 5 is a circuit diagram of a step-down DC/DC converter according to a first embodiment of the present invention.

According to the first embodiment, as shown in FIG. 5, the step-down DC/DC converter comprises a DC power supply 1, a MOSFET 2 as a main switching element having a drain terminal connected to the positive terminal of the DC power supply 1, a first diode 3 connected between the source terminal of the MOSFET 2 and the negative terminal of the DC power supply 1, with the source terminal of the MOSFET 2 being connected to the cathode of the diode 3, a series-connected circuit of an inductive element 4 and a capacitor 5 which are connected parallel to the diode 3, a control circuit 7 having a ground terminal connected to the source terminal of the MOSFET 2, for applying an on and off control signal to the gate terminal of the MOSFET 2, a charging resistor 12 connected between the positive terminal of the DC power supply 1 and the control circuit 7, for use in starting to energize the control circuit 7, a second capacitor 8 having a terminal connected to the resistor 12 and another terminal connected to the source terminal of the MOSFET 2 and serving as a power supply for energizing the control circuit 7, a second diode 9 connected between the junction between the inductive element 4 and the capacitor 5 and the resistor 12, the second diode 9 having a cathode connected to the resistor 12, a gate resistor 13 connected between the gate terminal of the MOSFET 2 and the control circuit 7, a rush-current limiting resistor 14 having a terminal connected to the positive terminal of the DC power supply 1, a rectifying diode bank 15 connected between the other terminal of the resistor 14 and the negative terminal of the DC power supply 1, the rectifying diode bank 15 having a cathode terminal connected to the resistor 14, and a commercial power supply 16 connected to the rectifying diode bank 15. The control circuit 7 has a normal/start mode selector switch 71 and a reference voltage power supply 72 for controlling the voltage across the second capacitor 8.

Operation of the step-down DC/DC converter thus arranged will be described below.

Figure 6:
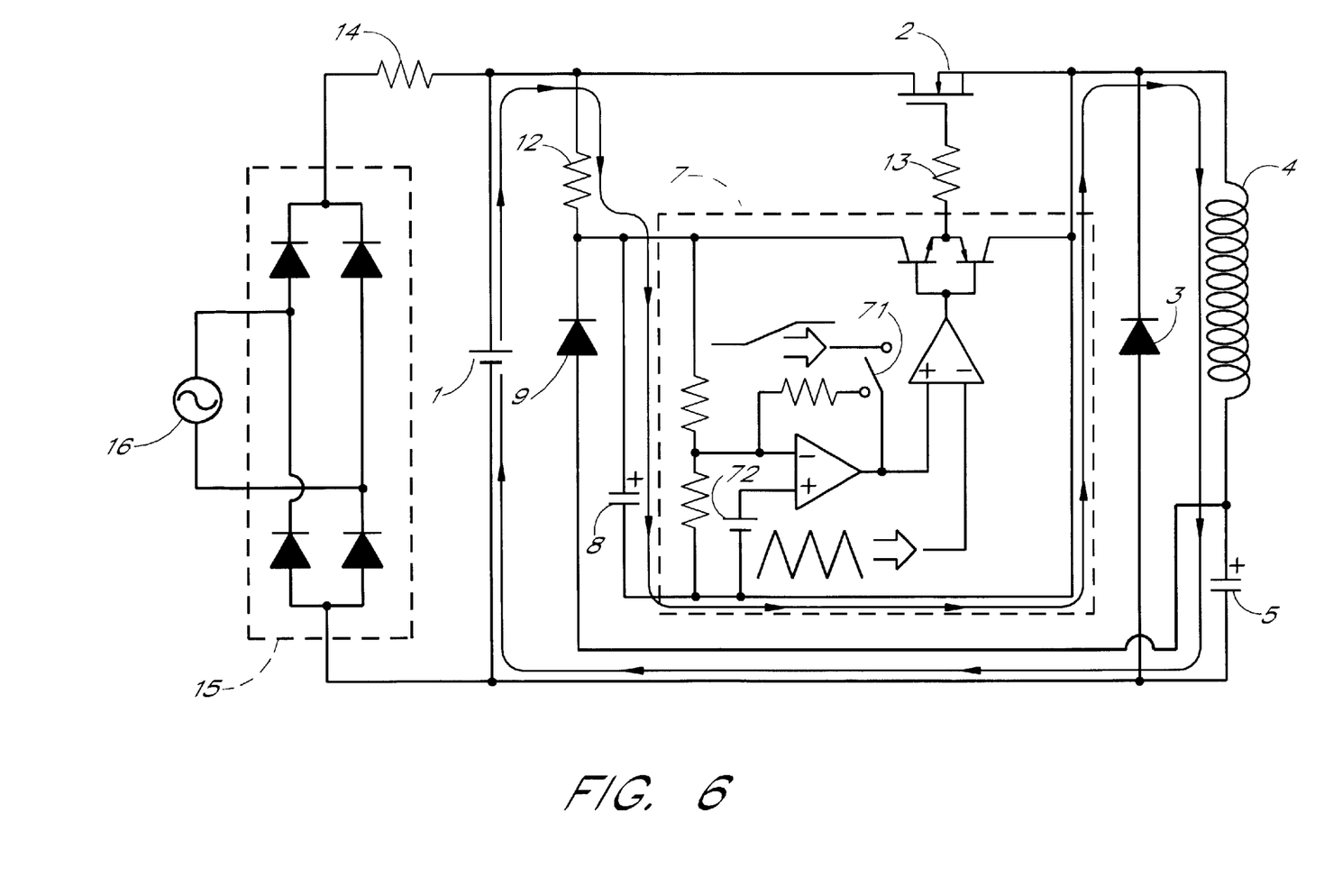
Figure 7:
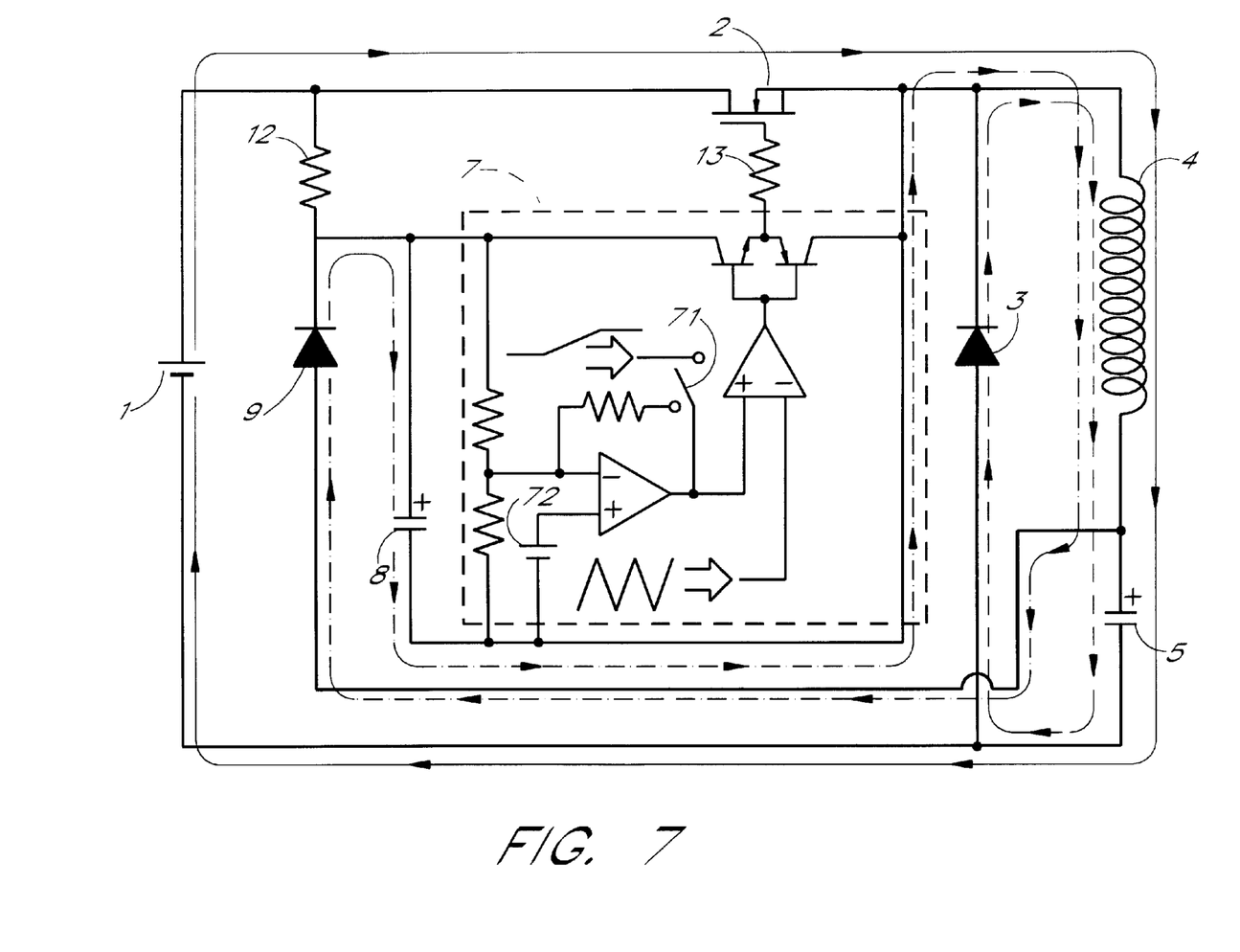
FIG. 7 is a circuit diagram showing current routes when a MOSFET 2 of the step-down DC/DC converter shown in FIG. 5 is turned on and off.

FIG. 6 is a circuit diagram showing a charging current route for the capacitor 8 at the time the commercial power supply of the step-down DC/DC converter shown in FIG. 5 is turned on, and FIG. 7 is a circuit diagram showing current routes when the MOSFET 2 of the step-down DC/DC converter shown in FIG. 5 is turned on and off.

When the commercial power supply 16 is turned on, the DC power supply 1 starts to operate.

A current flows from the positive terminal of the DC power supply 1 along a route shown in FIG. 6. The current (hereinafter referred to as a charging current) starts charging the capacitor 5 and the capacitor 8 that serves as the power supply for energizing the control circuit 7.

When the capacitor 8 is charged and the voltage thereacross increases to a sufficient level, the control circuit 7 for controlling the turning on and off of the MOSFET 2 starts to operate, so that the MOSFET 2 starts being turned on and off.

When the MOSFET 2 starts being turned on and off, the switch 71 is connected to a terminal A in FIG. 5, thereby increasing the on duration of the MOSFET 2 gradually from zero. Since the current consumed by the control circuit 7 is greater than the charging current for the capacitor 8, the voltage across the capacitor 8 is gradually lowered. Conversely, the voltage across the capacitor 5 rapidly increases as it is charged as shown in FIG. 7 when the MOSFET 2 is turned on and also turned off.

When the voltage across the capacitor 5 becomes higher than the voltage across the capacitor 8, a current flows along a route indicated by the broken line in FIG. 7 at the time the MOSFET 2 changes from an on state to an off state. At this time, the source potential of the MOSFET 2 (or the negative-terminal potential of the capacitor 8) is lower than the negative-terminal potential of the DC power supply 1 (or the negative-terminal potential of the capacitor 5) by the forward voltage across the diode 3. Therefore, the positive-terminal potential of the capacitor 8 becomes lower than the potential of the anode terminal of the diode 9 [(voltage across the capacitor 8)−(the forward voltage across the diode 3)+(forward voltage across the diode 9)], forming a charging route for the capacitor 8 from the positive terminal of the capacitor 5, as indicated by the dot-and-dash line in FIG. 7. The capacitor 8 which charges until the voltage across the capacitor 8 is equalized to the voltage across the capacitor 5.

Since the voltage across the capacitor 8 increases to a stable voltage, the control circuit 7 which is energized by the voltage across the capacitor 8 is continuously operated. After the switch 71 is connected to terminal B in FIG. 5, the control circuit 7 shifts to a normal mode of operation.

After the control circuit 7 shifts to the normal mode of operation due to the action of the switch 71, the control circuit 7 compares the voltage across the capacitor 8, as divided by resistors, with a voltage from the reference voltage power supply 72. The control circuit 7 controls the turning on and off of the MOSFET 2 in order to equalize the compared voltages.

The voltage across the capacitor 8 is controlled by the above operation. Since the voltage across the capacitor 8 is equal to the voltage across the capacitor 5, the voltage across the capacitor 5, i.e., the output voltage of the step-down DC/DC converter, is indirectly controlled.

(2nd Embodiment)

Figure 8:
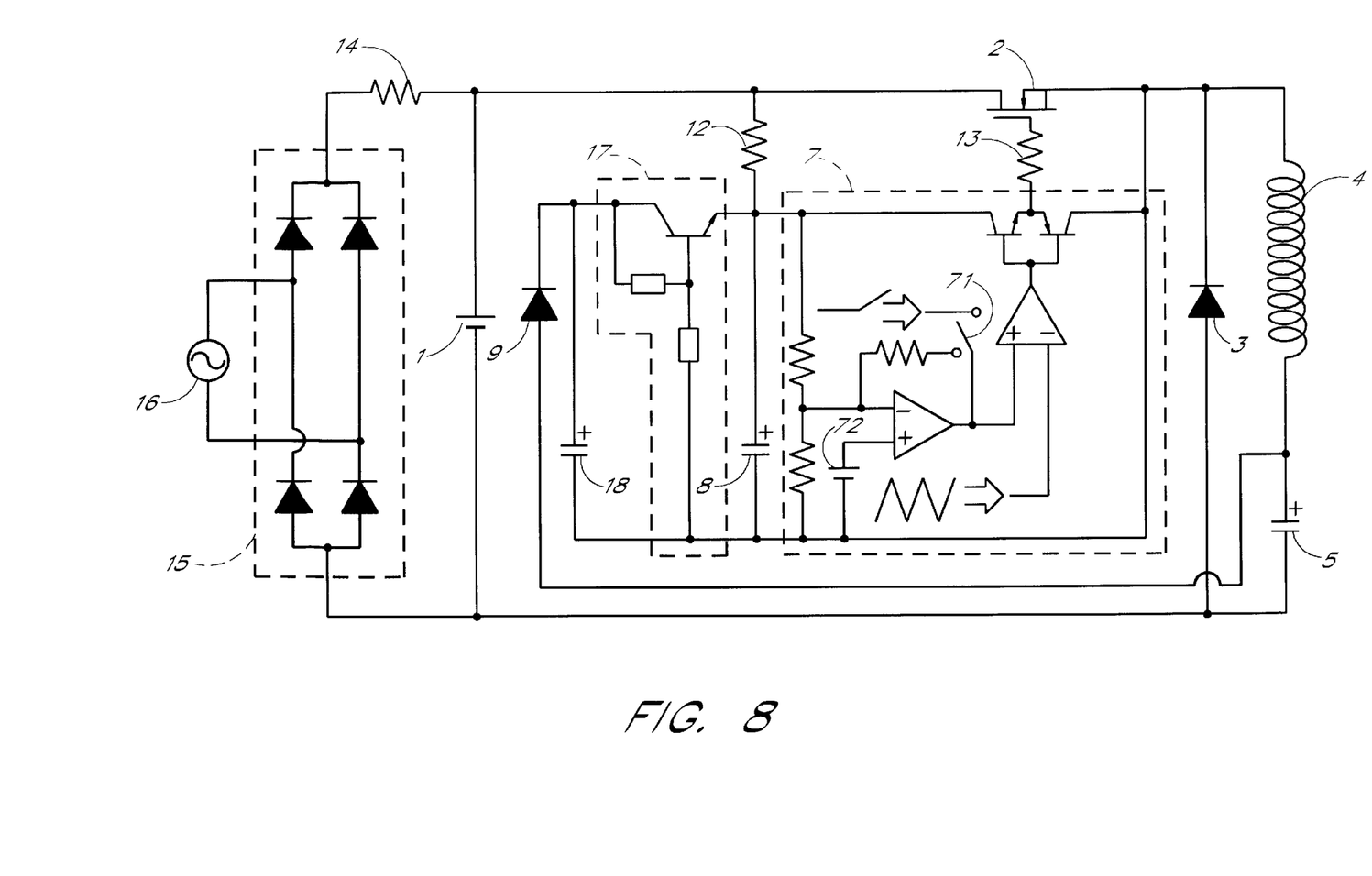
FIG. 8 is a circuit diagram of a step-down DC/DC converter according to a second embodiment of the present invention.

A step-down DG/DC converter according to a second embodiment of the present invention, in which the voltage across the capacitor 8 is lower than the voltage across the capacitor 5, will be described below.

FIG. 8 is a circuit diagram of the step-down DC/DC converter according to the second embodiment of the present invention.

As shown in FIG. 8, the step-down DC/DC converter according to the second embodiment includes, as parts added to the step-down DC/DC converter shown in FIG. 5, a step-down circuit 17 connected between the resistor 12 and the cathode terminal of the diode 9 and having an input terminal connected to the cathode terminal of the diode 9, an output terminal connected to the positive terminal of the capacitor 8 and the resistor 12, and a control terminal connected to the negative terminal of the capacitor 8, the step-down circuit 17 having a preset voltage drop, and a third capacitor 18 connected between the input and control terminals of the step-down circuit 17, the third capacitor 18 having a positive terminal connected to the input terminal of the step-down circuit 17.

In the step-down DC/DC converter of the above arrangement, after the commercial power supply is turned on, the voltage across the capacitor 5 and the voltage across the capacitor 18 become equal to each other. In the normal mode of operation, the control circuit 7 compares the voltage across the capacitor 8, as divided by resistors, with a voltage from the reference voltage power supply 72. The control circuit 7 controls the turning on and off of the MOSFET 2 in order to equalize the compared voltages. The voltage across the capacitor 8 which serves as a power supply for energizing the control circuit 7 is lower than the voltage across the capacitor 18 (or the voltage across the capacitor 5) by the amount of the voltage drop caused by the step-down circuit 17.

As described above, the control circuit 7 controls the voltage across the capacitor 8 for thereby indirectly controlling the voltage across the capacitor 5, i.e., the output voltage of the step-down DC/DC converter, which is higher than the voltage across the capacitor 8 by the amount of the voltage drop caused by the step-down circuit 17.

(3rd Embodiment)

Figure 9:
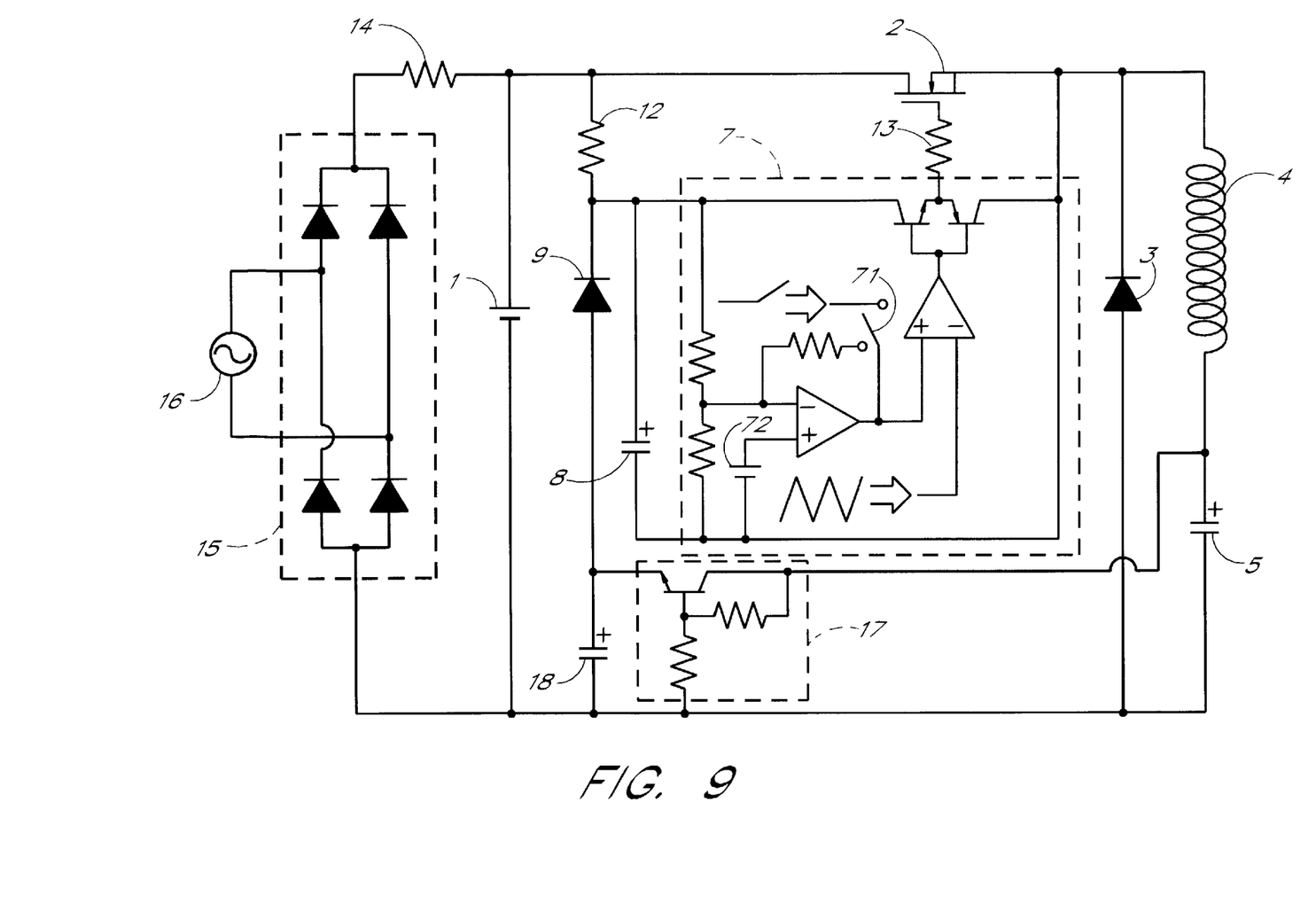
FIG. 9 is a circuit diagram of a step-down DC/DC converter according to a third embodiment of the present invention.

A step-down DC/DC converter according to a third embodiment of the present invention, in which the voltage across the capacitor 8 is lower than the voltage across the capacitor 5 as with the second embodiment, will be described below.

FIG. 9 is a circuit diagram of the step-down DC/DC converter according to the third embodiment of the present invention.

As shown in FIG. 9, the step-down DC/DC converter according to the third embodiment includes, as parts added to the step-down DC/DC converter shown in FIG. 5, a step-down circuit 17 connected between the positive terminal of the capacitor 5 and the anode terminal of the diode 9 and having an input terminal connected to the positive terminal of the capacitor 5, an output terminal connected to the anode terminal of the diode 9, and a control terminal connected to the negative terminal of the capacitor 5, the step-down circuit 17 having a preset voltage drop, and a third capacitor 18 connected between the output and control terminals of the step-down circuit 17, the third capacitor 18 having a positive terminal connected to the output terminal of the step-down circuit 17.

In the step-down DC/DC converter of the above arrangement, after the commercial power supply is turned on, the voltage across the capacitor 8 and the voltage across the capacitor 18 become equal to each other.

The control circuit 7 controls the voltage across the capacitor 8 for thereby controlling the voltage across the capacitor 18 so as to be equal to the voltage across the capacitor 8 for indirectly controlling the voltage across the capacitor 5, i.e., the output voltage of the step-down DC/DC converter, which is higher than the voltage across the capacitor 8 by the amount of the voltage drop caused by the step-down circuit 17.

(4th Embodiment)

Figure 10:
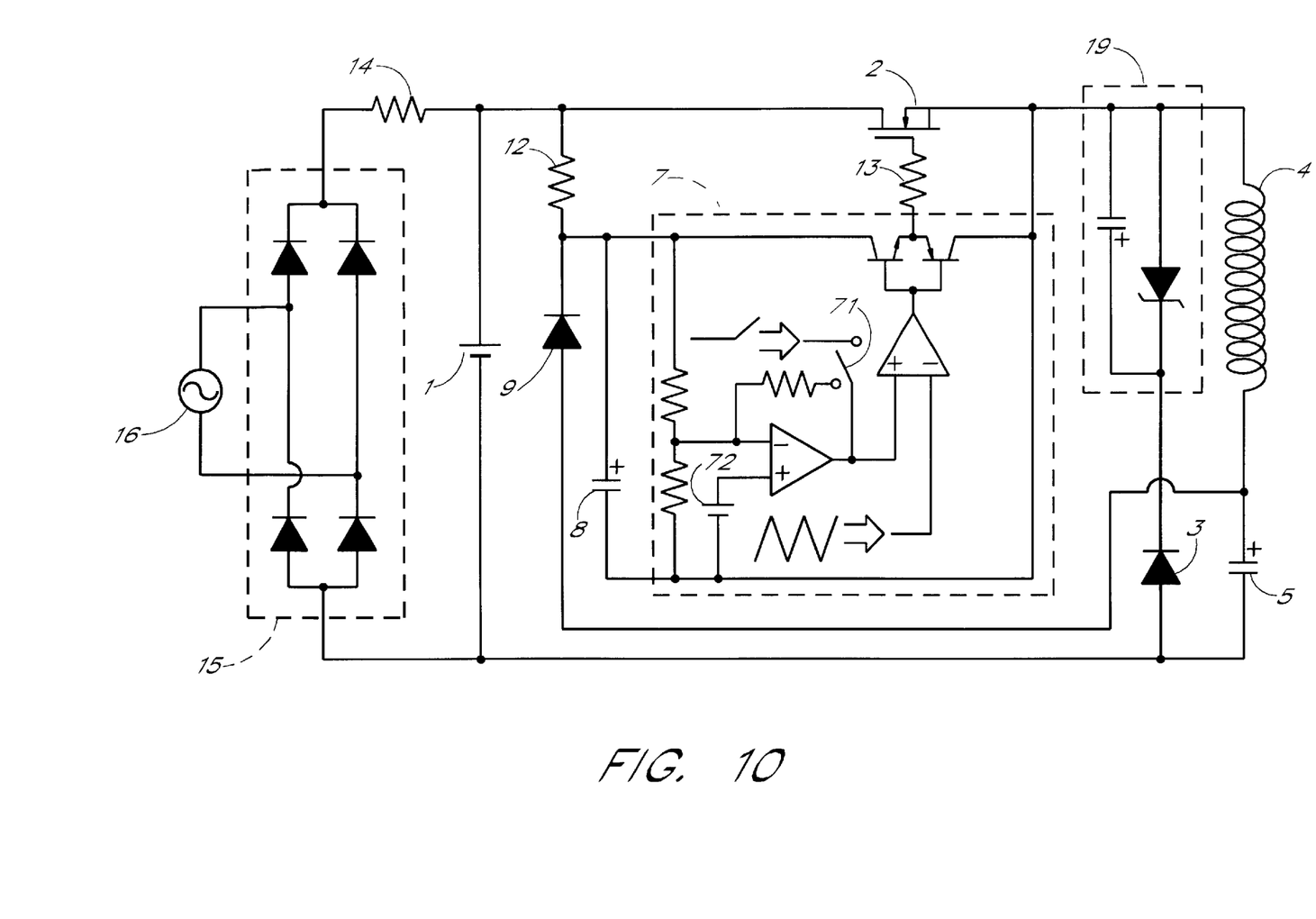
FIG. 10 is a circuit diagram of a step-down DC/DC converter according to a fourth embodiment of the present invention.

A step-down DC/DC converter according to a fourth embodiment of the present invention, in which the voltage across the capacitor 8 is higher than the voltage across the capacitor 5, will be described below.

FIG. 10 is a circuit diagram of the step-down DC/DC converter according to the fourth embodiment of the present invention.

As shown in FIG. 10, the step-down DC/DC converter according to the fourth embodiment includes, as a part added to the step-down DC/DC converter shown in FIG. 5, a step-down circuit 19 connected between the source terminal of the MOSFET 2, the inductive element 4, and the cathode terminal of the diode 3, and having an output terminal connected to the source terminal of the MOSFET 2 and the inductive element 4, the step-down circuit 19 having a preset voltage drop.

In the step-down DC/DC converter of the above arrangement, the voltage across the capacitor 8 is higher than the voltage across the capacitor 5 by the amount of the voltage drop caused by the step-down circuit 19. The control circuit 7 controls the voltage across the capacitor 8 for thereby indirectly controlling the voltage across the capacitor 5, i.e., the output voltage of the step-down DC/DC converter, which is lower than the voltage across the capacitor 8 by the amount of the voltage drop caused by the step-down circuit 17.

(5th Embodiment)

According to a fifth embodiment, the step-down circuit 19 shown in FIG. 10 and the diode 3 may be switched around.

(6th Embodiment)

Figure 11:
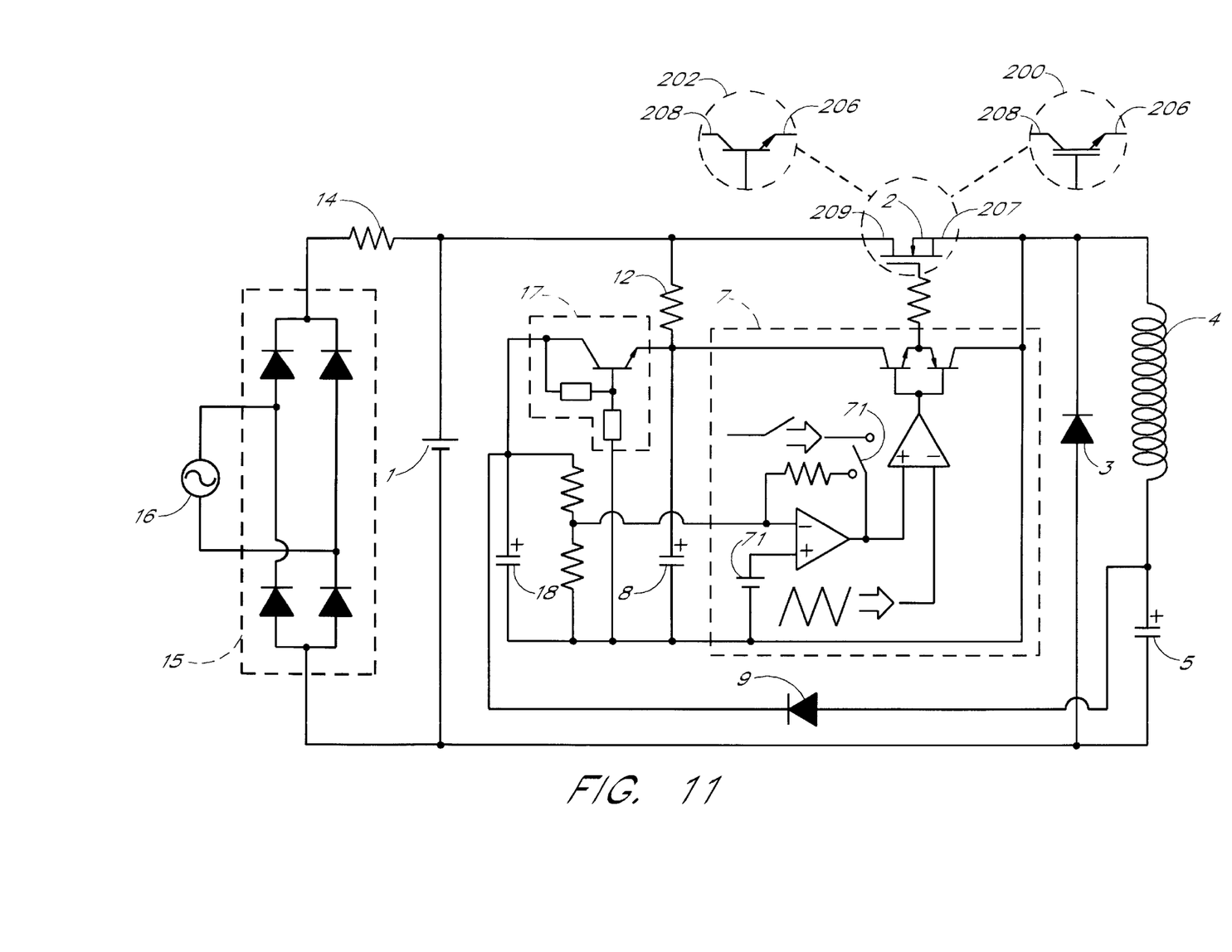
FIG. 11 is a circuit diagram of a step-down DC/DC converter according to a sixth embodiment of the present invention.

FIG. 11 is a circuit diagram of a step-down DC/DC converter according to a sixth embodiment of the present invention.

As shown in FIG. 11, the step-down DC/DC converter according to the sixth embodiment has a control circuit 7 connected to control the voltage across the capacitor 18, rather than a voltage across the capacitor 8 in FIG. 8.

In the step-down DC/DC converter of the above arrangement, after the commercial power supply is turned on, the voltage across the capacitor 5 and the voltage across the capacitor 18 become equal to each other.

The control circuit 7 controls the voltage across the capacitor 18 for thereby indirectly controlling the voltage across the capacitor 5, i.e., the output voltage of the step-down DC/DC converter.

In the first through sixth embodiments, the MOSFET is used as the main switching element. However, the present invention is not limited to the MOSFET, but may employ an IGBT 200 or a bipolar transistor 202 instead of the MOSFET, with an emitter terminal 206 connected as the source terminal 207 and a collector terminal 208 as the drain terminal 209.

According to the present invention, as described above, the step-down DC/DC converter has the second diode whose anode terminal is connected to the junction between the inductive element and the positive terminal of the first capacitor and whose cathode terminal is connected to the junction between the resistive element and the positive terminal of the second capacitor, and the main switching element whose source (or emitter) terminal connected to the ground terminal of the control circuit. Based on the fact that when the main switching element is turned off, the potential of the source (or emitter) terminal of the main switching element becomes lower than the output potential of the step-down DC/DC converter, the electric energy is supplied to the power supply for energizing the control circuit from the output terminal of the step-down DC/DC converter via the second diode. Therefore, the control circuit can maintain its energizing power supply and can increase the current consumption.

The step-down. DC/DC converter is capable of generating a low DC output voltage from a high DC input voltage and there are no significant restrictions on the main transistor used, on its energizing circuit and the frequency of the on and off cycles of the main switching element, etc.

Furthermore, based on the fact that the output voltage of the step-down DC/DC converter which serves as a power supply is equal to the voltage of the energizing power supply for the control circuit to be supplied with electric energy, the control circuit itself controls the voltage of the energizing power supply for indirectly controlling the output voltage of the step-down DC/DC converter. Thus, the step-down DC/DC converter is resistant to common-mode noise and capable of stably controlling the output voltage.

The step-down circuit with the preset voltage drop is used to offer the same advantages as those described above even when the output voltage of the stepdown DC/DC converter and the voltage of the energizing power supply for the control circuit are different from each other.

What is claimed is:

1. A step-down DC/DC converter having:
    a DC power supply;
    a main switching element having a drain terminal connected to a positive terminal of the DC power supply;
    an inductive element having a terminal connected to a source terminal of the main switching element;
    a first capacitor having a positive terminal connected to a terminal of the inductive element which is opposite to the terminal connected to the main switching element, and a negative terminal connected to a negative terminal of the DC power supply;
    a first diode connected between the source terminal of said main switching element and the negative terminal of said DC power supply parallel to a series-connected circuit of said inductive element and said first capacitor, said first diode having a cathode terminal connected to the source terminal of said main switching element;
    a resistive element having a terminal connected to the positive terminal of said DC power supply and the drain terminal of said main switching element;
    a second capacitor having a positive terminal connected to a terminal of the resistive element which is opposite to the terminal connected to the positive terminal of said DC power supply and the drain terminal of said main switching element, and a negative terminal connected to the source terminal of said main switching element and the cathode terminal of said first diode; and
    a control circuit having a ground terminal connected to the source terminal of said main switching element, for outputting a control signal for controlling the turning on and off of said main switching element to a gate terminal of said main switching element;
    characterized by:
        a second diode having an anode terminal connected to the junction between said inductive element and said first capacitor; and
        a step-down circuit connected between said resistive element and said second diode and having an input terminal connected to a cathode terminal of said second diode and an output terminal connected to said resistive element and the positive terminal of said second capacitor, said step-down circuit having a preset voltage drop.

2. A step-down DC/DC converter having:
    a DC power supply;
    a main switching element having a drain terminal connected to a positive terminal of the DC power supply;
    an inductive element having a terminal connected to a source terminal of the main switching element;
    a first capacitor having a positive terminal connected to a terminal of the inductive element which is opposite to the terminal connected to the main switching element, and a negative terminal connected to a negative terminal of the DC power supply;
    a first diode connected between the source terminal of said main switching element and the negative terminal of said DC power supply parallel to a series-connected circuit of said inductive element and said first capacitor, said first diode having a cathode terminal connected to the source terminal of said main switching element;
    a resistive element having a terminal connected to the positive terminal of said DC power supply and the drain terminal of said main switching element;
    a second capacitor having a positive terminal connected to a terminal of the resistive element which is opposite to the terminal connected to the positive terminal of said DC power supply and the drain terminal of said main switching element, arid a negative terminal connected to the source terminal of said main switching element and the cathode terminal of said first diode; and
    a control circuit having a ground terminal connected to the source terminal of said main switching element, for outputting a control signal for controlling the turning on and off of said main switching element to a gate terminal of said main switching element;
    characterized by:
        a second diode having a cathode terminal connected to the junction between said resistive element and said second capacitor; and
        a step-down circuit connected between the junction between said inductive element and said first capacitor and the anode terminal of said second diode and having an input terminal connected to the junction between said inductive element and said first capacitor and an output terminal connected to the anode terminal of said second diode, said step-down circuit having a preset voltage drop.

3. A step-down DC/DC converter having:

a DC power supply;

a main switching element having a drain terminal connected to a positive terminal of the DC power supply;

an inductive element having a terminal connected to a source terminal of the main switching element;

a first capacitor having a positive terminal connected to a terminal of the inductive element which is opposite to the terminal connected to the main switching element, and a negative terminal connected to a negative terminal of the DC power supply;

a first diode connected between the source terminal of said main switching element and the negative terminal of said DC power supply parallel to a series-connected circuit of said inductive element and said first capacitor, said first diode having a cathode terminal connected to the source terminal of said main switching element;

a resistive element having a terminal connected to the positive terminal of said DC power supply and the drain terminal of said main switching element;

a second capacitor having a positive terminal connected to a terminal of the resistive element which is opposite to the terminal connected to the positive terminal of said DC power supply and the drain terminal of said main switching element, and a negative terminal connected to the source terminal of said main switching element and the cathode terminal of said first diode; and a control circuit having a ground terminal connected to the source terminal of said main switching element, for outputting a control signal for controlling the turning on and off of said main switching element to a gate terminal of said main switching element;

characterized by:

a second diode having an anode terminal connected to the junction between said inductive element and said first capacitor and a cathode terminal connected to the junction between said resistive element and said second capacitor; and a step-down circuit connected between the source terminal of said main switching element and said inductive element and the cathode terminal of said first diode and having an output terminal connected to the source terminal of said main switching element and said inductive element, said step-down circuit having a preset voltage drop.

4. A step-down DC/DC converter having:

a DC power supply;

a main switching element having a drain terminal connected to a positive terminal of the DC power supply;

an inductive element having a terminal connected to a source terminal of the main switching element;

a first capacitor having a positive terminal connected to a terminal of the inductive element which is opposite to the terminal connected to the main switching element, and a negative terminal connected to a negative terminal of the DC power supply;

a first diode connected between the source terminal of said main switching element and the negative terminal of said DC power supply parallel to a series-connected circuit of said inductive element and said first capacitor, said first diode having a cathode terminal connected to the source terminal of said main switching element;

a resistive element having a terminal connected to the positive terminal of said DC power supply and the drain terminal of said main switching element;

a second capacitor having a positive terminal connected to a terminal of the resistive element which is opposite to the terminal connected to the positive terminal of said DC power supply and the drain terminal of said main switching element, and a negative terminal connected to the source terminal of said main switching element and the cathode terminal of said first diode; and a control circuit having a ground terminal connected to the source terminal of said main switching element, for outputting a control signal for controlling the turning on and off of said main switching element to a gate terminal of said main switching element;

characterized by:

a second diode having an anode terminal connected to the junction between said inductive element and said first capacitor and a cathode terminal connected to the junction between said resistive element and said second capacitor; and a step-down circuit connected between the anode terminal of said first diode and the negative terminal of said DC power supply and the negative terminal of said first capacitor and having an input terminal connected to the negative terminal of said DC power supply and the negative terminal of said first capacitor, said step-down circuit having a preset voltage drop.

5. A step-down DC/DC converter having:

a DC power supply;

a main switching element having a drain terminal connected to a positive terminal of the DC power supply;

an inductive element having a terminal connected to a source terminal of the main switching element;

a first capacitor having a positive terminal connected to a terminal of the inductive element which is opposite to the terminal connected to the main switching element, and a negative terminal connected to a negative terminal of the DC power supply;

a first diode connected between the source terminal of said main switching element and the negative terminal of said DC power supply parallel to a series-connected circuit of said inductive element and said first capacitor, said first diode having a cathode terminal connected to the source terminal of said main switching element;

a resistive element having a terminal connected to the positive terminal of said DC power supply and the drain terminal of said main switching element;

a second capacitor having a positive terminal connected to a terminal of the resistive element which is opposite to the terminal connected to the positive terminal of said DC power supply and the drain terminal of said main switching element, and a negative terminal connected to the source terminal of said main switching element and the cathode terminal of said first diode; and a control circuit having a ground terminal connected to the source terminal of said main switching element, for outputting a control signal for controlling the turning on and off of said main switching element to a gate terminal of said main switching element;

characterized by:

a second diode having an anode terminal connected to the junction between said inductive element and said first capacitor and a cathode terminal connected to the junction between said resistive element and said second capacitor; and wherein said control circuit compares a voltage across said second capacitor and a reference voltage generated therein with each other, and outputs said control signal to the gate terminal of said main switching element based on the result of comparison.

6. A step-down DC/DC converter according to claim 1, characterized in that said control circuit compares a voltage across said second capacitor with a reference voltage generated therein, and outputs said control signal to the gate terminal of said main switching element based on the result of comparison.

7. A step-down DC/DC converter according to claim 2, characterized in that said control circuit compares a voltage across said second capacitor with a reference voltage generated therein, and outputs said control signal to the gate terminal of said main switching element based on the result of comparison.

8. A step-down DC/DC converter according to claim 3, characterized in that said control circuit compares a voltage across said second capacitor with a reference voltage generated therein, and outputs said control signal to the gate terminal of said main switching element based on the result of comparison.

9. A step-down DC/DC converter according to claim 4, characterized in that said control circuit compares a voltage across said second capacitor with a reference voltage generated therein, and outputs said control signal to the gate terminal of said main switching element based on the result of comparison.

10. A step-down DC/DC converter having:

a DC power supply;

a main switching element having a drain terminal connected to a positive terminal of the DC power supply;

an inductive element having a terminal connected to a source terminal of the main switching element;

a first capacitor having a positive terminal connected to a terminal of the inductive element which is opposite to the terminal connected to the main switching element, and a negative terminal connected to a negative terminal of the DC power supply;

a first diode connected between the source terminal of said main switching element and the negative terminal of said DC power supply parallel to a series-connected circuit of said inductive element and said first capacitor, said first diode having a cathode terminal connected to the source terminal of said main switching element;

a resistive element having a terminal connected to the positive terminal of said DC power supply and the drain terminal of said main switching element;

a second capacitor having a positive terminal connected to a terminal of the resistive element which is opposite to the terminal connected to the positive terminal of said DC power supply and the drain terminal of said main switching element, and a negative terminal connected to the source terminal of said main switching element and the cathode terminal of said first diode; and a control circuit having a ground terminal connected to the source terminal of said main switching element, for outputting a control signal for controlling the turning on and off of said main switching element to a gate terminal of said main switching element;

characterized by:

a second diode having an anode terminal connected to the junction between said inductive element and said first capacitor and a cathode terminal connected to the junction between said resistive element and said second capacitor; and wherein said control circuit compares a potential difference between the source terminal of said main switching element and the cathode terminal of said second diode and a reference voltage generated therein with each other, and outputs said control signal to the gate terminal of said main switching element based on the result of comparison.

11. A step-down DC/DC converter according to claim 1, characterized in that said control circuit compares a potential difference between the source terminal of said main switching element and the cathode terminal of said second diode with a reference voltage generated therein, and outputs said control signal to the gate terminal of said main switching element based on the result of comparison.

12. A step-down DC/DC converter according to claim 2, characterized in that said control circuit compares a potential difference between the source terminal of said main switching element and the cathode terminal of said second diode with a reference voltage generated therein, and outputs said control signal to the gate terminal of said main switching element based on the result of comparison.

13. A step-down DC/DC converter according to claim 3, characterized in that said control circuit compares a potential difference between the source terminal of said main switching element and the cathode terminal of said second diode with a reference voltage generated therein, and outputs said control signal to the gate terminal of said main switching element based on the result of comparison.

14. A step-down DC/DC converter according to claim 4, characterized in that said control circuit compares a potential difference between the source terminal of said main switching element and the cathode terminal of said second diode with a reference voltage generated therein, and outputs said control signal to the gate terminal of said main switching element based on the result of comparison.

15. The step-down DC/DC converter according to claim 1, wherein said main switching element comprises a MOSFET.

16. The step-down DC/DC converter according to claim 1, wherein said main switching element comprises an IGBT.

17. The step-down DC/DC converter according to claim 1, wherein said main switching element comprises a bipolar transistor.

* * * * *